(12) United States Patent
Thetford

(10) Patent No.: US 6,562,897 B1
(45) Date of Patent: May 13, 2003

(54) ETHER/ESTER DISPERSANTS

(75) Inventor: Dean Thetford, Blackley (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/674,273

(22) PCT Filed: Mar. 3, 1999

(86) PCT No.: PCT/GB99/00642

§ 371 (c)(1),
(2), (4) Date: Oct. 30, 2000

(87) PCT Pub. No.: WO99/55762

PCT Pub. Date: Nov. 4, 1999

(30) Foreign Application Priority Data

Apr. 29, 1998 (GB) ............................................. 9809116

(51) Int. Cl.[7] .............................................. C08L 41/00
(52) U.S. Cl. ...................... 524/547; 526/274; 524/556; 558/179; 558/180
(58) Field of Search ................................ 526/274, 911, 526/910; 524/547, 556; 558/179, 180

(56) References Cited

U.S. PATENT DOCUMENTS 5,130,463 A * 7/1992 Haubennestel et al. ..... 558/172

FOREIGN PATENT DOCUMENTS

| EP | 558 965 | 6/1975 |
|----|---------|--------|
| EP | 759 440 | 2/1997 |
| WO | WO 95 34593 | 12/1995 |
| WO | WO 96 36656 | 11/1996 |
| WO | WO 97 19948 | 6/1997 |

OTHER PUBLICATIONS

Chemical Abstracts, vol. 82, No. 24, Jun. 16, 1975, abstract No. 163055, "Photopolymers for flexographic printing plates", XP002104476, & JP 49109104.

* cited by examiner

Primary Examiner—David W. Wu
Assistant Examiner—William Cheung
(74) Attorney, Agent, or Firm—Pillsbury Winthrop LLP

(57) ABSTRACT

A dispersant which is a phosphate ester of a polymer which contains at least one ether group and a poly(oxyalkylenecarbonyl) chain (POAC chain) derivable from two or more different hydroxycarboxyl acids or lactones thereof. Also disclosed is the use of the dispersants in paints and printing inks including millbases. The preferred dispersants are phosphate esters of an alkyl end-capped poly(oxyalkylenecarbonyl) chain alcohol where the POAC chain is derived from ε-caprolactone and δ-valerolactone and the alkyl group is derived from a monohydroxypolyalkyleneglycol.

20 Claims, No Drawings

ETHER/ESTER DISPERSANTS

The present invention relates to a compound for dispersing a particulate solid in a liquid medium, its method of preparation and to compositions and millbases containing said compound and a particulate solid, including paints and inks.

WO 97/19948 discloses a dispersant which is a phosphate ester of a block copolymer RO—$(C_2H_4O)_m(PES)_n$—OH wherein R is $C_{1-4}$-alkyl, PES is a polyester derived from a cyclic lactone such as valerolactone or ε-caprolactone, m is from 5 to 60, n is from 2 to 30 and where the molecular weight of $RO(C_2H_4O)_m$ is greater than the molecular weight of $(PES)_n$. The dispersants are said to be particularly effective for dispersing particulate solids such as pigments in an aqueous medium.

It has now been found that dispersants exhibiting superior properties such as solubility in the liquid medium can be obtained by using more than one hydroxycarboxylic acid or lactone to make the polyester $(PES)_n$.

According to the invention there is provided a dispersant which is a phosphate ester of a polymer which contains at least one ether group and a poly(oxyalkylenecarbonyl) chain derivable from two or more different hydroxycarboxylic acids or lactones thereof including their salts. The dispersant is hereinafter referred to as "Ether dispersant". Preferably, the poly(oxyalkylenecarbonyl) chain is derivable from two different hydroxy carboxylic acids or lactones thereof. The molecular weight of the polymer can vary between wide limits depending whether the dispersant is to be used for dispersing a particulate solid in a polar liquid medium including water or whether it is for use in a substantially non-polar liquid medium. The molecular weight of the polymer is typically from 200 to 10,000, preferably from 300 to 5,000 and especially, from 400 to 2,000.

According to a preferred aspect of the invention, the dispersant is a phosphate ester of a copolymer of formula 1

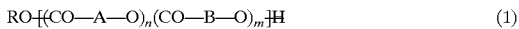

$$RO\text{-}[(CO\text{—}A\text{—}O)_n(CO\text{—}B\text{—}O)_m]H \quad (1)$$

including salts thereof wherein

R is a polymerisation terminating group containing at least one ether link;.

A and B are each, independently, different alkenylene groups or $C_{1-17}$-alkylene groups optionally substituted by alkyl;

n and m are integers; and n+m is from 2 to 200.

The copolymer of formula 1 may be a block or random polymer.

In the dispersant of formula 1, $[(CO\text{—}A\text{—}O)_n(CO\text{—}B\text{—}O)_m]$ represents a polyoxyalkylenecarbonyl chain and the group RO may be attached to either of the oxyalkylenecarbonyl groups containing A and B. It is referred to hereinafter as a pplyoxyakylenecarbonyl chain or POAC chain. The copolymer of formula 1 containing the polymerisation terminating group is referred to hereinafter as a TPOAC alcohol.

Where A and/or B is alkenylene it is preferably $C_{2-17}$-alkenylene and especially $C_{15-17}$-alkenylene.

When the dispersant is for use in a non-polar medium, it is preferred that at least one of A and B is $C_{8-17}$-alkylene and when the dispersant is for use in a polar liquid medium, including water, it is preferred that one, or more preferably both, A and B are $C_{1-6}$-alkylene and especially $C_{4-6}$-alkylene optionally substituted by alkyl.

The alkyl substituent in A and B may be linear or branched and is preferably $C_{1-8}$-alkyl, more preferably $C_{1-6}$-alkyl and especially $C_{1-4}$-alkyl.

It is particularly preferred that the molecular weight of the ether moiety RO is greater than that of the POAC chain.

The polymerisation terminating group R containing at least one ether group is preferably a residue of a mono-hydroxy glycol or a mono-hydroxy polyalkyleneglycol. Preferred glycols or polyalkyleneglycols are those derivable from $C_{2-4}$alkyleneoxide, especially ethyleneoxide or propyleneoxide, including mixtures thereof. When the dispersant is for use in a polar liquid, including water, the glycol or polyalkyleneglycol is preferably derivable from ethylene oxide and when the dispersant is for use in a non-polar liquid medium, the glycol or polyalkyleneglycol is preferably derivable from propyleneoxide. When the dispersant is for use in a polar liquid medium, including water, it is particularly preferred that the glycol or polyalkyleneglycol is derivable from ethylene oxide and that both A and B are different $C_{1-6}$-alkylene groups.

Examples of hydroxycarboxylic acids are 12-hydroxystearic, ricinoleic, 12-hydroxydodecanoic, 5-hydroxydodecanoic, 5-hydroxydecanoic, 4-hydroxydecanoic, glycolic, lactic, 6-hydroxyhexanoic and 5-hydroxypentanoic acids.

Examples of lactones are propiolactone, butyrolactone, valerolactone (especially δ-valerolactone) and optionally alkyl-substituted ε-caprolactone. The alkyl substituent in ε-caprolactone may be linear or branched and is preferably $C_{1-8}$-alkyl, more preferably $C_{1-6}$-alkyl and especially $C_{1-4}$-alkyl. Examples of such groups are methyl and tertiary butyl.

The alkyl-substituted ε-caprolactones are obtainable by oxidation of alkyl-substituted cyclohexanone and consequently many are mixtures of alkyl-substituted ε-caprolactone. Thus, the oxidation of 2-methyl cyclohexanone often results in a mixture of 7-methyl (95%) and 3-methyl (5%) ε-caprolactone. However, the oxidation of 4-alkylcyclohexanone results only in the 5-alkyl ε-caprolactone. Other examples of alkyl-substituted ε-caprolactone are 6-methyl; 4-methyl; 5-methyl; 5-tertiary butyl; 4,6,6-trimethyl and 4,4,6-trimethyl derivatives. 7-methyl ε-caprolactone is the preferred alkyl-substituted ε-caprolactone.

The polymerisation terminating group R is preferably derived from a hydroxy compound T—OH which is attached to the glycol or polyalkyleneglycol by an ether linkage wherein T is $C_{1-35}$-hydrocarbyl which is optionally substituted by halogen, tertiary amino, hydroxy, $C_{1-6}$-alkoxy, amine, ester or urethane groups.

When T contains amide, ester or urethane groups it preferably contains two such groups and the group R is preferably a diester, diamide or di-urethane containing at least one ether link. Groups represented by R which contain either amide, ester or urethane groups are conveniently prepared by reacting two fragments of T which contain a hydroxy or amino group with, for example, a dibasic acid or anhydride thereof or a di-isocyanate.

Examples of dibasic acids or anhydrides are terephthalic, phthalic anhydride, adipic acid, maleic acid and maleic anhydride.

Examples of di-isocyanates are toluene di-isocyanate and isophorone di-isocyanate.

The group T may be aromatic, hetrocyclic, alicyclic or aliphatic which may be linear or branched, saturated or unsaturated. It is preferred that T contains not greater than 20 carbon atoms and particularly not greater than 10 carbon atoms. It is especially preferred that T is $C_{1-6}$-alkyl such as methyl.

Other examples of the group T are $C_2H_5$—, $CH_3(CH_2)_9$—, $CH_3(CH_2)_{11}$—, $CH_3(CH_2)_{15}$—, $CH_3(CH_2)_{17}$—, $CH_3(CH_2)_{29}$—, $CH_3(CH_2)_7CH$=$CH(CH_2)_7$—, $CH_3OCH_2$—, $CH_3(CH_2)_4CH$=$CHCH_2CH$=$CH(CH_2)_7$— the residue of abietyl alcohol, i.e. abietyl alcohol without the OH group, nonylphenol.

As noted hereinbefore, it is particularly preferred that T is $C_{1-6}$-alkyl and also that R is derivable from ethylene oxide since such dispersants have been found particularly effective in dispersing particulate solids in a polar liquid medium, including water.

Examples of R containing at least one ether link are the residue of tripropyleneglycol monomethylether, dipropyleneglycol monomethylether, triethyleneglycol monomethylether, methoxypropyleneglycols and methoxyethyleneglycols having a molecular weight between 250 and 750, ethoxylated $C_{9-11}$-fatty alcohol with a molecular weight of 270 and ethoxylated nonylphenol having a molecular weight of 360.

The dispersant of Formula 1 is obtainable by polymerising two different hydroxycarboxylic acids or lactones thereof in the presence of a monohydric alcohol R—OH to form a TPOAC alcohol having a terminal hydroxy group i.e. a POAC chain having a terminal hydroxy group and a polymerisation terminal group. The TPOAC alcohol is subsequently reacted with a phosphating agent, especially $P_2O_5$ and polyphosphoric acid.

The TPOAC alcohol may be prepared by reacting the hydroxy carboxylic acids or lactones thereof together and then reacting the compound so formed containing the POAC chain with a polymerisation terminating compound. However, it is preferred to form the TPOAC alcohol directly by reacting the hydroxy carboxylic acids, or lactones thereof, in the presence of a polymerisation terminating compound. The reaction is preferably carried out in an inert atmosphere and optionally in the presence of an inert solvent and esterification catalyst. The reaction is typically carried out between 150 and 180° C. It is also preferred to carry out the reaction in the absence of an inert solvent.

Examples of suitable catalysts are tetra-alkyl titanate, for, example, tetrabutyltitanate, zinc salt of an organic acid such as zinc acetate, tin salts of organic acids such as dibutyl tin dilaurate, zirconium salt of an aliphatic alcohol such as zirconium isopropoxide, toluenesulphonic acid or a strong organic acid such as haloacetic acid and particularly trifluoroacetic acid.

The dispersant which is a phosphate ester of Formula 1 is obtainable by reacting a TPOAC alcohol with a phosphating agent wherein the ratio of the alcohol to each phosphorus atom of the phosphating agent is from 3:1 to 1:1 and especially from 2:1 to 1:1. It is especially preferred that the ratio of each TPOAC alcohol to each phosphorus atom of the phosphating agent is less than 2, for example, about 1.5:1 when the dispersant is a mixture of mono- and di-phosphate esters.

The reaction between the TPOAC alcohol and phosphating agent is preferably carried out in an inert atmosphere such as nitrogen, under anhydrous conditions. The reaction may be carried out in an inert solvent but it is more convenient to react the TPOAC alcohol with the phosphating agent in the absence of a solvent. The reaction temperature is preferably above 60 and especially above 80° C. In order to avoid charring the dispersant, the temperature is preferably less than 120 and especially less than 100° C.

As a less preferred variant, the dispersant of Formula 1 may also be prepared by reacting a monohydric, alcohol with a preformed POAC acid and subsequently reacting the TPOAC alcohol with a phosphating reagent.

The dispersants may also contain additional ester, amide or amine salt groups formed by reacting the dispersant with an alcohol or alkanolamine.

The dispersants may be in the form of a free acid or it may form a salt with an alkali metal, ammonia, an amine, alkanolamine or quaternary ammonium salt depending whether the dispersant is to be used to disperse a particulate solid in a polar medium, including water, or in a non-polar medium. When the medium is a polar medium or water, the dispersant is preferably in the form of its free acid or in the form of its alkali metal salt and when the medium is a non-polar medium the dispersant is preferably in the form of a salt with an amine. Examples of suitable amines are n-butylamine, diethanolamine and dimethylaminopropylamine.

The TPOAC alcohols used in the preparation of the dispersants are novel.

Thus, according to the invention there is provided a TPOAC alcohol of formula $RO[(CO—A—O)_n(CO—B—O)_m]H$ wherein R, A, B, n and m are as defined hereinbefore.

As noted hereinbefore, the dispersants are particularly useful for dispersing a particulate solid in a liquid medium.

According to a further aspect of the invention there is provided a composition comprising a particulate solid and an Ether Dispersant.

According to a still further aspect of the invention there is provided a dispersion comprising an Ether Dispersant, a particulate solid and a liquid medium.

The solid present in the dispersion may be any inorganic or organic solid material which is substantially insoluble in the liquid medium at the temperature concerned and which it is desired to stabilise in a finely divided form therein.

Examples of suitable solids are pigments for solvent inks; pigments, extenders, fibres and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, and biocides, agrochemicals and pharmaceuticals which are applied as dispersions in organic media.

Examples of suitable plastics materials are synthetic resins such as those used as sheet moulding compounds and bulk, moulding compounds which comprise unsaturated polyester resins containing reinforcing fibres and fillers.

A preferred solid is a pigment from any of the recognised classes of pigments described, for example, in the Third Edition of the Colour Index (1971). and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; fire retardant fillers such as aluminium hydroxide and magnesium hydroxide; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and agrochemicals such as the fungicides flutriafen, carbendazim, chlorothalonil and mancozeb.

The liquid medium present in the dispersions of the invention is preferably a polar organic liquid or a substantially non-polar organic liquid or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the above mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl. acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are for example, aromatic hydrocarbons, such as toluene and xylene, aliphatic hydrocarbon such as pentane, heptane, octane and halogenated aliphatic and aromatic hydrocarbons, such as trichloroethylene, perchloroethylene and chlorobenzene. The non-polar organic liquid may also be a commercially available mixture such as an aliphatic or aromatic distillate, for example, white spirits.

The liquid medium may also be water or a mixture of water with a polar organic liquid, substantially non-polar organic liquid or halogenated hydrocarbon. When the liquid medium contains water, the amount of water is preferably less than 5% by weight of the liquid medium.

When the liquid medium is water it is preferred that the molecular weight of the polyester represented by $-\!\!+\!\!(CO\!-\!A\!-\!O)_n(CO\!-\!B\!-\!O)_m\!\!+\!\!-$ in formula 1 is less than or equal to the molecular weight of the polyether moiety represented by the group RO—.

Preferably, the liquid medium is a polar organic liquid.

Examples of suitable polar resins, as the medium for the dispersion form of the present invention, are film-forming resins such as are/suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

If desired, the dispersions may contain other ingredients, for example resins (where these do not already constitute the organic medium), binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the liquid medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the liquid medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the liquid medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant, liquid medium and a film-forming resin.

Typically, the mill-base contains from 20 to 70% by weight particulate solid based on the total weight of the mill-base. Preferably, the particulate solid is not less than 30, and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The dispersants of the present invention exhibit advantage over known dispersants which contain a POAC chain derived from a single hydroxycarboxylic acid or lactone. In particular, they exhibit superior solubility in liquid media such as solvents and do not separate or crystallise when stored at 4° C. for lengthy periods. When stored at low temperatures, separation can occur at −240° C. but the dispersants readily re-dissolve on warming to 4–10° C. When incorporated into paints and painting inks, the dispersants of the present invention give rise to higher gloss readings and lower haze values in the resultant paints and inks.

The invention is further illustrated by the following examples wherein all references to amounts are in parts by weight unless indicated to the contrary.

EXAMPLES

Preparation of Alkyl ε-caprolactone Intermediates

Lactone 1

4 and 6-methyl ε-caprolactone 3-methylcyclohexanone (10 parts, 0.089M ex. Aldrich) was dissolved in dichloromethane (400 ml) and sodium bicarbonate (37 parts) added, portionwise, with vigorous stirring at 18–20° C. under a nitrogen atmosphere. A suspension of 3-chloroperoxybenzoic acid (24.17 parts, 0.098M ex. Fluka) in dichloromethane (100 ml) was then added over 10 minutes with external cooling to maintain a temperature below 20° C. and the reaction continued at 18–20° C. by stirring, for a further 4 hours. The reaction mix was then shaken with a 10% aqueous solution of sodium sulphite (2×250 ml) followed by water (2×250 ml) and then dried over anhydrous magnesium sulphate. After evaporating the solvent a mixture of 4- and 6-methyl, ε-caprolactone was obtained as a thin yellow oil (8 parts).

Lactone 2

3- and 7-methyl ε-caprolactone

This was prepared in the same manner as that described for Lactone 1 except using the same weight of 2-methylcyclohexanone (ex. Aldrich) in place of 3-methylcyclohexanone. The product was obtained as a clear oil (8 parts) and is mainly 7-methyl ε-caprolactone (95%).

Lactone 3

5-methyl ε-caprolactone

This was prepared in similar manner to Lactone 1 except using 4-methyl cyclohexanone (50 parts; 0.445 m ex. Aldrich) in place of the 3-methylcyclohexanone with appropriate increase in the dichloromethane (1500 ml), sodium bicarbonate (8.1 parts, 1.0M) and 3-chloroperoxybenzoic acid (123 parts, 0.5M). The reaction temperature was maintained below 10° C. throughout. The 5-methyl ε-caprolactone was obtained as a clear yellow oil (49 parts).

Lactone 4

5-tertbutyl ε-caprolactone

This was prepared in the same manner as Lactone 1 except using 4-tert butylcyclohexanone (10 parts, 0.065 m ex. Aldrich), 3-chloroperoxybenzoic acid (17.5 parts, 0.0713M), sodium bicarbonate (11.5 parts, 0.143M) and dichloromethane (750 ml) in place of the 3-methyl cyclohexanone and amounts described for Lactone 1. The product was obtained as an oil (10.2 parts).

Lactone 5

4,6,6- and 4,4,6-trimethyl ε-caprolactone 3,3,5-Trimethylcyclohexanone (10 parts, 0.071M ex. Fluka) was dissolved in dichloromethane (200 ml). 3-chloroperoxybenzoic acid (30.6 parts, 0.142M) was added, portionwise, with stirring and the reaction mix cooled externally below 5° C. Trifluoroacetic acid (8 parts, 0.071M ex. Fluka) was added dropwise over 30 minutes with stirring at 0–5° C. and the reactants stirred for a further 20 hours allowing the temperature to rise to 18–20° C.

The reaction mass was then poured into a 10% w/w aqueous solution of sodium sulphite (50 ml) and allowed to stand. The solvent layer was separated and shaken with 10% aqueous sodium sulphite (2×50 ml), 10% w/w aqueous potassium carbonate (3×50 ml) and water (2×50 ml). Finally, the solvent phase was dried over anhydrous sodium sulphate and the solvent evaporated. The product was obtained as a clear colourless oil (11 parts).

Examples of Dispersants

In the following examples, the composition of the polymerisation terminating group containing at least one ether link indicates the residue of T—OH (e.g. Me or Et followed by the polyalkyleneoxide (e.g. PEG for polyethyleneglycol). The components of the attached POAC chain are indicated (e.g. δ-val, ε-cap, etc. for δ-valerolactone and ε-caprolactone). The figures in parentheses indicate the molar ratio of the ether containing polymerisation group to lactone(s). The ratio of the TPOAC alcohol to phosphorus atom of the phosphating agent is indicated at the end of the descriptor.

Example 1

EtO PEG 3 (1) ε-cap (1.45) δ-val (1.45) phosphate (2:1 phosphorus atom)

Triethyleneglycolmonoethyl ether (EtO PEG3; 25 parts, 0.14M ex Fluka), ε-caprolactone (23.21 parts, 0.203M ex Aldrich) and δ-valerolactone (20.36 parts, 0.203 ex Fluka) were stirred at 130° C. under nitrogen. Zirconium butylate (0.4 parts) was added and the reactants heated to 175° C. and stirred at this temperature for 6 hours. After the reactants stirred at 80° C. for 6 hours. On cooling, the product was obtained as a brown viscous liquid (80 parts). This is Dispersant 1.

Comparative Example A

EtO PEG 3 (1) ε-cap (2.9) phosphate (2:1 phosphorus atom)

This was prepared in an identical manner to Dispersant 1 in Example 1 except using ε-caprolactone (46.41 parts) as the sole lactone and using 0.10 parts zirconium butylate and 23.85 parts polyphosphoric acid instead of the amounts described in Example 1. On cooling, the product was obtained as a brown wax (82 parts). This is Dispersant A.

Example 2

MeO PEG 750 (1) δ-val (4) 7-Me ε-cap (3.5) (2:1 phosphorus atom)

Polyethyleneglycolmonomethyl ether (MW 750, 25 parts, 0.033M ex Fluka), δ-valerolactone (13.35 parts, 0.133M) and 7-methyl-ε-caprolactone (14.95 parts, 0.1166M ex Lactone 2) were stirred under nitrogen at 130° C. Zirconium butylate (0.3 parts) were added and the reactants stirred under nitrogen for 6 hours at 175° C. After cooling to 80° C., polyphosphoric acid (5.78 parts, 0.0407M) was added and the reactants stirred at 80° C. for 6 hours. After cooling, the product, Dispersant 2, was obtained a brown, viscous liquid (45 parts).

Comparative Example B

MeO PEG 750 (1) δ-val (7.5) phosphate (2:1 phosphorus atom)

This was prepared in an identical manner to Dispersant 2 of Example 2 except using 35 parts of the glycol, 35.04 parts δ-valerolactone, 0.2 parts zirconium butylate and 7.86 parts polyphosphoric acid. The product was obtained as a brown viscous liquid which on cooling gave a brown wax (71 parts). This is Dispersant B.

Example 3

MeO PEG 750 (1) ε-cap (4.5) δ-val (2.5) (2:1 phosphorus atom)

This was also prepared in analogous manner to Dispersant 2 of Example 2 except using MeO PEG 750 (30 parts, 0.04 mole), ε-caprolactone (20.54 parts, 0.18 mole) and δ-valerolactone (10.01 parts, 0.1 mole) in place of the amounts used in Example 2. Phosphation was carried out using 6.66 parts (0.047 moles) polyphosphoric acid. The product was obtained as a brown viscous liquid (60 parts). This is Dispersant 3.

Examples 4 to 6 and Comparative Examples C and D

The dispersants (2 parts) were dissolved in a 4:1 mixture of methoxypropylacetate and n-butanol (10 ml) by heating is necessary. The appearance of the solution was examined visually at 200° C., after 3 days at 4° C., after 2 days at −10° C. and after 2 days storage at −10° C. and allowing to warm to 20° C. The results are given in Table 1 below.

TABLE 1

| | | Appearance of Solution | | | |
|---|---|---|---|---|---|
| Example | Dispersant | At 20° C. | After 3 days at 4° C. | After 2 days at −10° C. | After 2 days at −10° C. and warming to 20° C. |
| 4 | 1 | Clear | Clear | Clear | Clear |
| 5 | 2 | Clear | Clear | Crystals | Clear |
| 6 | 3 | Clear | Clear | Crystals | Clear |
| C | A | Clear | Crystals | Crystals | Slight cloudy layer |
| D | B | Clear | Crystals | Crystals | Clear |

Example 7

MeO PEG 2000 (1) ε-cap (4) δ-val (3) (1.5:1 phosphorus atom)

Polyethyleneglycolmonomethylether MW 2000 (50 parts, 0.025M ex Fluka), ε-caprolactone (11.41 parts, 0.1M ex Aldrich) and δ-valerolactone (7.51 parts, 0.075M) were stirred under nitrogen at 140° C. Zirconium butylate (0.3 parts) was added and the reactants stirred under nitrogen for 6 hours. After cooling to 90° C., polyphosphoric acid (2.85 parts) was added and the reactants were stirred at 90–95° C. for 6 hours. A brown viscous liquid was obtained giving a yellow-brown wax on cooling (65 parts). This is Dispersant 4.

Comparative Example C

MeO PEG 2000 (1) ε-cap (7) (1.5:1 phosphorus atom)

This was prepared in identical manner to Dispersant 4 of Example 7 except using 19.97 parts ε-caprolactone as the sole lactone. The product, Dispersant C, was obtained as a pale yellow viscous oil (65 parts) which formed a white gel on cooling.

Dispersant 4 and Dispersant C (3 parts) were each dissolved in water (7 parts) by heating. After cooling to 20° C., Dispersant 4 gave a clear aqueous solution, and Dispersant C gave a white gel.

Examples 8 to 18

The Ether Dispersants listed in Table 2 below were made in similar manner to Dispersant 1 described in Example 1 except using the starting materials and amounts as indicated in Table 2. The components used to make the alkyl end-capped polyoxyalkylene chain alcohol (TPOAC alcohol) is as given in Table 2 where the molar amounts are given in parentheses following the components. The ratio of TPOAC alcohol to each phosphorus atom of the phosphating agent ($P_2O_5$) is listed as "phosphorus ratio". The figures following PEG and PPG indicate the number-average molecular weight of the polyalkyleneglycolmonoalkylether.

TABLE 2

| Example | Dispersant | TPOAC alcohol | Phosphorus ratio |
|---|---|---|---|
| 8 | 5 | MeO PEG 550 (1), ε-cap (2), 5-Me-ε-cap (2) | 3:1 |
| 9 | 6 | MeO PEG 750 (1), ε-cap (2), δ-val (2) | 3:1 |
| 10 | 7 | MeO PEG 750 (1), ε-cap (2), 7-Me-ε-cap (2) | 3:1 |
| 11 | 8 | MeO PEG 750 (1), ε-cap (4), δ-val (2) | 3:1 |
| 12 | 9 | MeO PEG 750 (1), ε-cap (4), 7-Me-ε-cap (2) | 3:1 |
| 13 | 10 | MeO PEG 350 (1), ε-cap (2), 7-Me-ε-cap (1) | 3:1 |
| 14 | 11 | MeO PEG 350 (1), ε-cap (2), δ-val (1) | 3:1 |

TABLE 2-continued

| Example | Dispersant | TPOAC alcohol | Phosphorus ratio |
|---|---|---|---|
| 15 | 12 | MeO PEG 550 (1), ε-cap (2), δ-val (2) | 3:1 |
| 16 | 13 | MeO PEG 350 (1), ε-cap (14), δ-val (9) | 3:1 |
| 17 | 14 | MeO PEG 750 (1), ε-cap (30), δ-val (16) | 3:1 |
| 18 | 15 | MeO PEG 206 (1), ε-cap (3.2), 4-Me-ε-cap (2) | 2:1 |

Footnote to Table 2
MeO PEG 550 is polyethyleneglycolmonomethylether of MW 550 ex Fluka
MeO PEG 750 is polyethyleneglycolmonomethylether of MW 750 ex Fluka
MeO PEG 350 is polyethyleneglycolmonomethylether of MW 350 ex Fluka
MeO PPG 206 is tripropyleneglycolmonomethylether of MW 206 ex Aldrich
ε-cap is ε-caprolactone ex Aldrich
δ-val is δ-valerolactone ex Fluka
5-Me-ε-cap is Lactone 3
7-Me-ε-cap is Lactone 2
4-Me-ε-cap is Lactone 1

Comparative Examples D to I

The comparative dispersants listed in Table 3 below were made in similar manner to Dispersant 1 described in Example 1 except using the polyalkyleneglycol mono alkyether indicated in the column headed TPOAC alcohol. The figures in parentheses indicate the molar amounts of polyalkyleneglycolmonoalkylether and ε-caprolactone. Again, the ratio of TPOAC alcohol to each phosphorus atom of the phosphating agent ($P_2O_5$) is listed as "phosphorus ratio" and the figures following PEG and PPG indicate the number-average molecular weight of the polyalkyleneglycolmonoalkylether; Dispersants I and G are equivalent to Examples 20 and 8, respectively, of U.S. Pat. No. 5,130,463.

TABLE 3

| Comparative Dispersant | TPOAC alcohol | Phosphorus ratio |
|---|---|---|
| D | MeO PEG 164 (1) ε-cap (3) | 3:1 |
| E | MeO PPG 206 (1) ε-cap (2.7) | 3:1 |
| F | EtO PEG 178 (1) ε-cap (2.9) | 3:1 |
| G | MeO PPG 206 (1) ε-cap (5.2) | 2:1 |
| H | MeO PEG 750 (1) ε-cap (46) | 3:1 |
| I | MeO PEG 350 (1) ε-cap (23.2) | 3:1 |

Footnote to Table 3
MeO PEG 164 is polyethyleneglycolmonomethylether of MW 164
MeO PPG 206 is polypropyleneglycolmonomethylether of MW 206
EtO PEG 178 is polyethyleneglycolmonoethylether of MW 178
MeO PEG 750, MeO PEG 350 and ε-cap are as explained in the footnote to Table 2.

Examples 18 to 28 and Comparative Examples J to O

The dispersants (2 parts) were dissolved in a 4:1 mixture of methoxypropylacetate/n-butanol (10 parts) with heating as necessary. The solutions so obtained were examined after standing for 16 hours at 20° C., after storing for 2 days at 4° C., after storing for 2 days at −10° C. and after storage for 2 days at −10° C. and allowing to return to 20° C. over a 6 hour period. The results are given in Table 4 below. These examples show that the Dispersants according to the invention exhibit superior solubility and superior stability to analogous dispersants where the TPOAC alcohol is derived from ε-caprolactone as the sole lactone.

TABLE 4

| | | Storage | | | |
|---|---|---|---|---|---|
| Example | Dispersant | 16 hours at 20° C. | 2 days at 4° C. | 2 days at −10° C. | 2 days at −10° C. then 6 hours at 20° C. |
| 18 | 5 | CL | CL | H | CL |
| 19 | 6 | CL | CL | CR | CL |
| 20 | 7 | CL | CL | CR | CL |
| 21 | 8 | CL | CL | CR | CL |
| 22 | 9 | CL | CL | CR | CL |
| 23 | 10 | CL | CL | CL | CL |
| 24 | 11 | CL | CL | H | CL |
| 25 | 12 | CL | CL | CR | CL |
| 26 | 13 | H | few CR | CR | H |
| 27 | 14 | CL | CL | CR | CL |
| 28 | 15 | CL | CL | CR | CL |
| J | D | few CR | CR | CR | CR |
| K | E | few CR | CR | CR | CR |
| L | F | sl H | CR | CR | CR |
| M | H | few CR | CR | CR | CR |
| N | I | CL | CR | CR | CR |
| O | G | CL | CR | CR | CR |

Footnote to Table 4
CL is clear, H is hazy, CR is crystals and sl is slight

Examples 29 to 42 and Comparative Examples P to W

The Dispersant (0.2 part) was dissolved in a 4:1 mixture of methoxypropylacetate/n-butanol (2.3 parts) in a glass vial with warming as necessary. Glass beads (3 mm, 17 parts) were added together with titanium dioxide white pigment (7.5 parts Tioxide TR92 ex Tioxide). The vial was then sealed and the pigment milled on a horizontal shaker for 16 hours. The fluidity of the resultant dispersions was assessed by hand-shaking using an arbitrary scale A to E (good to bad). The results are given in Table 5 below under the column headed TR92.

The titanium dioxide millings were repeated except using Dispersant (0.25 parts), 4:1 mixture of methoxypropylacetate/n-butanol (6.75 parts) and a red iron oxide pigment (3 parts, Sicotrans Red L2817 ex BASF). The fluidity of the resultant dispersions is also recorded in Table 5 under the column headed L2817.

TABLE 5

| Example | Dispersant | TR92 Fluidity | L2817 Fluidity |
|---|---|---|---|
| 29 | 1 | A | A/B |
| 30 | 2 | A | B/C |
| 31 | 3 | A | B/C |
| 32 | 5 | A | C |
| 33 | 6 | A | C |
| 34 | 7 | B | B |
| 35 | 8 | A/B | B/C |
| 36 | 9 | A | C |
| 37 | 10 | A | B/C |
| 38 | 11 | A/B | B |
| 39 | 12 | A | B |
| 40 | 13 | B | C |
| 41 | 14 | B | B/C |
| 42 | 15 | A | A |
| P | A | A | A |
| Q | B | B | C |
| R | D | B | B |
| S | E | B | B |
| T | F | B | C |
| U | G | A | A |
| V | H | C | C |
| W | I | C | C |
| Control 1 | | B | B/C |
| Control 2 | | E | D |

Footnote to Table 5
Control 1 is the phosphate ester of ε-caprolactone polymerised in the presence of lauryl alcohol.
Control 2 contains no dispersant and where the amount of dispersant is replaced by the same amount of solvent.

What is claimed is:

1. A dispersant which is a phosphate ester of a TPOAC alcohol of formula 1

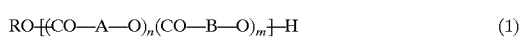

including salts thereof wherein

R is a polymerization terminating group containing at least one ether link;

A and B are each, independently, different alkenylene groups or $C_{1-17}$-alkylene groups optionally substituted by alkyl;

n and m are positive integers; and n+m is from 2 to 200.

2. A dispersant as claimed in claim 1 wherein R is the residue of a monohydroxyglycol or a monohydroxypolyalkyleneglycol.

3. A dispersant as claimed in claim 2 wherein the glycol or polyalkyleneglycol is derivable from ethylene oxide and/or propylene oxide.

4. A dispersant as claimed in either claim 2 or claim 3 wherein the glycol or polyalkyleneglycol is derivable from ethylene oxide.

5. A dispersant as claimed in claim 1 wherein R is a residue of a hydroxy compound T—OH which is attached to a monohydroxyglycol or a monohydroxypolyalkyleneglycol.

6. A dispersant as claimed in claim 5 wherein T is $C_{1-35}$-hydrocarbyl optionally substituted by halogen, tertiary amino, hydroxy or $C_{1-6}$-alkoxy.

7. A dispersant as claimed in claim 5 wherein T is $C_{1-6}$-alkyl.

8. A dispersant as claimed in claim 5 wherein T is methyl.

9. A dispersant as claimed in claim 1 wherein R is the residue of tripropyleneglycolmonomethylether, triethyleneglycolmonomethylether, methoxyethyleneglycols, and methoxypropyleneglycols having a molecular weight between 250 and 750.

10. A dispersant as claimed in claim 1 wherein A and B are both $C_{1-6}$-alkylene optionally substituted by alkyl.

11. A dispersant as claimed in claim 1 wherein A and B are derivable from δ-valerolactone and ε-caprolactone optionally substituted by $C_{1-6}$-alkyl.

12. A dispersant as claimed in claim 1 wherein one of A and B is derivable from δ-valerolactone and the other is derivable from ε-caprolactone.

13. A dispersant as claimed in claim 1 wherein the molecular weight of the ether moiety is greater than that of the POAC chain.

14. A dispersant as claimed in claim 1 wherein the ratio of the TPOAC alcohol to phosphorus atom is between 3:1 and 1:1.

15. A process for making a dispersant as claimed in claim 1 which comprises reacting two different hydroxycarboxylic acids or lactones thereof in the presence of a polymerisation terminating compound in an inert atmosphere at a temperature between 150 and 180° C. to form a TPOAC alcohol and reacting the TPOAC alcohol with a phosphating agent.

16. A composition comprising a particulate solid and a dispersing agent as claimed in claim 1.

17. A dispersion comprising a dispersant as claimed in claim 1, a particulate solid and a liquid medium.

18. A dispersion as claimed in claim 17 wherein the liquid medium is a polar organic liquid or water.

19. A millbase comprising a dispersant as claimed in claim 1, a particulate solid, a liquid medium and a film-forming resin.

20. A paint or ink comprising a dispersant as claimed in claim 1.

* * * * *